Patented Dec. 22, 1942

2,305,826

UNITED STATES PATENT OFFICE 2,305,826

METHOD FOR THE PREVENTION OF ROPINESS IN BAKED WARE

Anton Iglauer, Ingelheim-on-the-Rhine, Germany; vested in the Alien Property Custodian No Drawing. Application March 1, 1940, Serial No. 321,768. In Germany March 1, 1939

6 Claims. (Cl. 99—90)

This invention relates to a method for the prevention of ropiness in baked wares, according to which to the dough, at the preparation of the same, acetate of lime is added.

It is known, that certain organic acids, particularly fatty acids and oxyfatty acids alone as well as in combination with inorganic acids or with acid salts increase the keeping capacity of the baked ware. They prevent the known bread diseases which are caused by the activity of different kinds of bacteria, for instance bacteria of the mesentericus group.

The addition of free fatty acids has the inconvenience that the baked ware smells sourish and that thorough baking is retarded. Also the calcium salts of the fatty acids with 3 to 10 carbon atoms in the molecule, recently proposed for the preservation of baked ware, show this inconvenience.

As has been found, acetic acid salts do not show this inconvenience, and according to the invention it is proposed to add calcium acetate when preparing the dough and particularly in order to prevent ropiness of the baked ware.

To prevent the growth of mold aqueous solutions of acetates have already been used for brushing the baked bread. Hereby it is, however, not possible to prevent ropiness, but merely the growth of mold can be retarded to a certain extent. It has to be considered that, whilst the mold fungus gets on to the baked bread from the outer side, the ropiness develops in the diseased bread from the interior of the same. The spores of the bacteria producing ropiness, contrary to the spores of mold fungus, endure the high temperatures employed at the baking and develop unimpeded in the interior of the bread where the temperature does not rise considerably above 100°. It is therefore also not possible to prevent the ropiness in the interior of the bread by brushing with an aqueous acetate solution the surface of baked bread.

The following comparative experiments show, that by the method according to the invention much better results are obtained than by the use of the known methods, for instance by employment of calcium propionate or free acetic acid. It is especially mentioned that an aqueous suspension of ropiness producing bacteria has been added to the doughs used as initial material in order to make the existing differences particularly obvious.

To produce dough 1000 grs. of wheat flour from wheat of usual type were mixed with 40 grs. of yeast, 18 grs. of common salt and 600 cc. water. To the water used for preparing the dough 0.6% of calcium acetate was added. The dough obtained was of normal appearance and its rising was normal. Two breads made each of 650 grs. of dough showed a good brownish color and a volume of baked ware from 1950 to 1960 cc. 100 minutes were necessary before the breads were done. The breads were then stored under usual conditions and showed no bread disease at all even after four days.

When working under otherwise similar conditions but with the difference that to the dough water 0.6% of calcium propionate was added instead of 0.6% of calcium acetate, the following was ascertained:

The dough was slightly moist and rose slowly. About 130 minutes were necessary before the bread was done. The volume of the baked bread amounted to only 1720 cc. After storing for four days a feeble discoloring and the smell of ropiness could be ascertained.

Similar results were obtained if to the dough water, instead of 0.6% of calcium acetate, 0.46% of glacial acetic acid were added. Also in this instance the dough did rise very slowly and the time required for making the bread done was 130 minutes. The bread volume was 1790 respectively 1760 cc. After four days storage a certain discoloring and the smell of ropiness could be ascertained on the breads.

Experiments made without additions to the dough water resulted in a normal dough of normal rising power. The time before the bread was done amounted to 100 minutes and the bread volume was 1950 or 1970 cc. respectively. Contrary to the breads obtained according to the new method, the breads produced without additions showed a strong discoloring after having been stored four days and ropiness could be ascertained.

The comparative experiments prove the superiority of the method according to the invention.

The quantity of the calcium acetate added may be varied within wide limits. Preferably the addition will be as small as possible, and it has been ascertained that calcium acetate in a concentration from 0.4 to 0.8%, and preferably of 0.6%, added to the dough water could prevent ropiness of infected dough at a temperature of 40° in moist atmosphere.

I claim:

1. Method for the prevention of ropiness in baked ware, consisting in adding calcium acetate to the dough at the preparation of the same.

2. Method for the prevention of ropiness in baked ware, consisting in adding calcium acetate to the dough at the preparation of the same in a concentration of 0.6% calculated to the dough liquid which is employed.

3. Method for the prevention of ropiness in baked ware, consisting in providing a fermentation dough, incorporating therein prior to baking ropiness inhibiting quantities of calcium acetate.

4. Method for the prevention of ropiness in baked ware, consisting in providing a fermentation dough, incorporating therein prior to baking ropiness inhibiting quantities of calcium acetate in an amount from 0.4% to 0.8% of the dough mixture.

5. Baked ware made from a fermentation dough, and inhibited against ropiness by the presence in the dough of inhibiting quantities of calcium acetate, the inhibitor being distributed throughout the baked ware.

6. Baked ware made from a fermentation dough, and inhibited against ropiness by the presence in the dough of inhibiting quantities of calcium acetate in an amount from 0.4% to 0.8% of the dough mixture, the inhibitor being distributed throughout the baked ware.

ANTON IGLAUER.